US008004568B2

(12) United States Patent
Nagaoka et al.

(10) Patent No.: US 8,004,568 B2
(45) Date of Patent: Aug. 23, 2011

(54) IMAGE PICK-UP APPARATUS

(75) Inventors: Shiro Nagaoka, Tokyo (JP); Kuniaki Takahashi, Saitama (JP); Tatsuhiko Ikehata, Tokyo (JP); Kei Tashiro, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1232 days.

(21) Appl. No.: 11/655,912

(22) Filed: Jan. 22, 2007

(65) Prior Publication Data

US 2008/0008452 A1 Jan. 10, 2008

(30) Foreign Application Priority Data

Jun. 28, 2006 (JP) ................................ 2006-177930

(51) Int. Cl.
*H04N 5/225* (2006.01)
*H04N 5/76* (2006.01)

(52) U.S. Cl. .......... 348/207.99; 348/231.2; 348/333.02; 386/210; 386/224; 386/240; 386/243; 707/821; 707/830

(58) Field of Classification Search .................. 386/200, 386/210, 216, 219, 224, 230, 234, 239, 240, 386/278–282, 290, 343, 351; 707/821, 822, 707/830; 348/207.99, 211, 99, 222.1, 239, 348/333.01, 333.02, 333.05
See application file for complete search history.

(56) References Cited

U.S. PATENT DOCUMENTS

| | | | | |
|---|---|---|---|---|
| 6,404,978 | B1 * | 6/2002 | Abe | 386/55 |
| 2001/0052937 | A1 * | 12/2001 | Suzuki | 348/239 |
| 2002/0127001 | A1 * | 9/2002 | Gunji et al. | 386/124 |
| 2002/0129043 | A1 * | 9/2002 | Nakada et al. | 707/200 |
| 2004/0096199 | A1 * | 5/2004 | Chou et al. | 386/125 |
| 2004/0244047 | A1 | 12/2004 | Shinkai et al. | |
| 2005/0259978 | A1 * | 11/2005 | Naitoh | 386/125 |
| 2006/0007501 | A1 * | 1/2006 | Kawada | 358/448 |
| 2006/0056800 | A1 * | 3/2006 | Shimagami et al. | 386/52 |

FOREIGN PATENT DOCUMENTS

| | | |
|---|---|---|
| JP | 2004-180279 | 6/2004 |
| JP | 2004-364325 A | 12/2004 |
| JP | 2005-209320 | 8/2005 |

OTHER PUBLICATIONS

Japanese Office Action dated Aug. 24, 2010 for Appln. No. 2006-177930.

Japanese Office Action dated Apr. 12, 2011 for Appln. No. 2006-177930.

* cited by examiner

*Primary Examiner* — Thai Tran
*Assistant Examiner* — Mishawn Dunn
(74) *Attorney, Agent, or Firm* — Pillsbury Winthrop Shaw Pittman, LLP

(57) ABSTRACT

In an image pick-up apparatus of the invention, when capturing is started, a chapter formation-commanding portion transfers a chapter table to a memory. When a user depresses a chapter formation button, a chapter is formed in an empty table of the chapter table. After completion of the capturing, the chapter formation-commanding portion transfers the chapter table stored in the memory to a storage portion. By performing the operation described above, a chapter can be formed in an arbitrary time position.

5 Claims, 11 Drawing Sheets

10 IMAGE PICK-UP APPARATUS
208
CCD
207
A/D CONVERSION PORTION
209
LAN
210
USB
202
SIGNAL PROCESSING PORTION
200
CPU
206
MEMORY
203
DISPLAYING PORTION
205
MOVING IMAGE CODEC PORTION
204
30 RECORDING DATA
STORAGE PORTION
201
INPUT SIGNAL-GENERATING PORTION
201A
CAPTURING BUTTON
201B
JOG DIAL
201C
CROSS BUTTON
201D
CHAPTER FORMATION BUTTON
201E
CHAPTER DISPLAY BUTTON
201e INPUT BUTTON GROUP

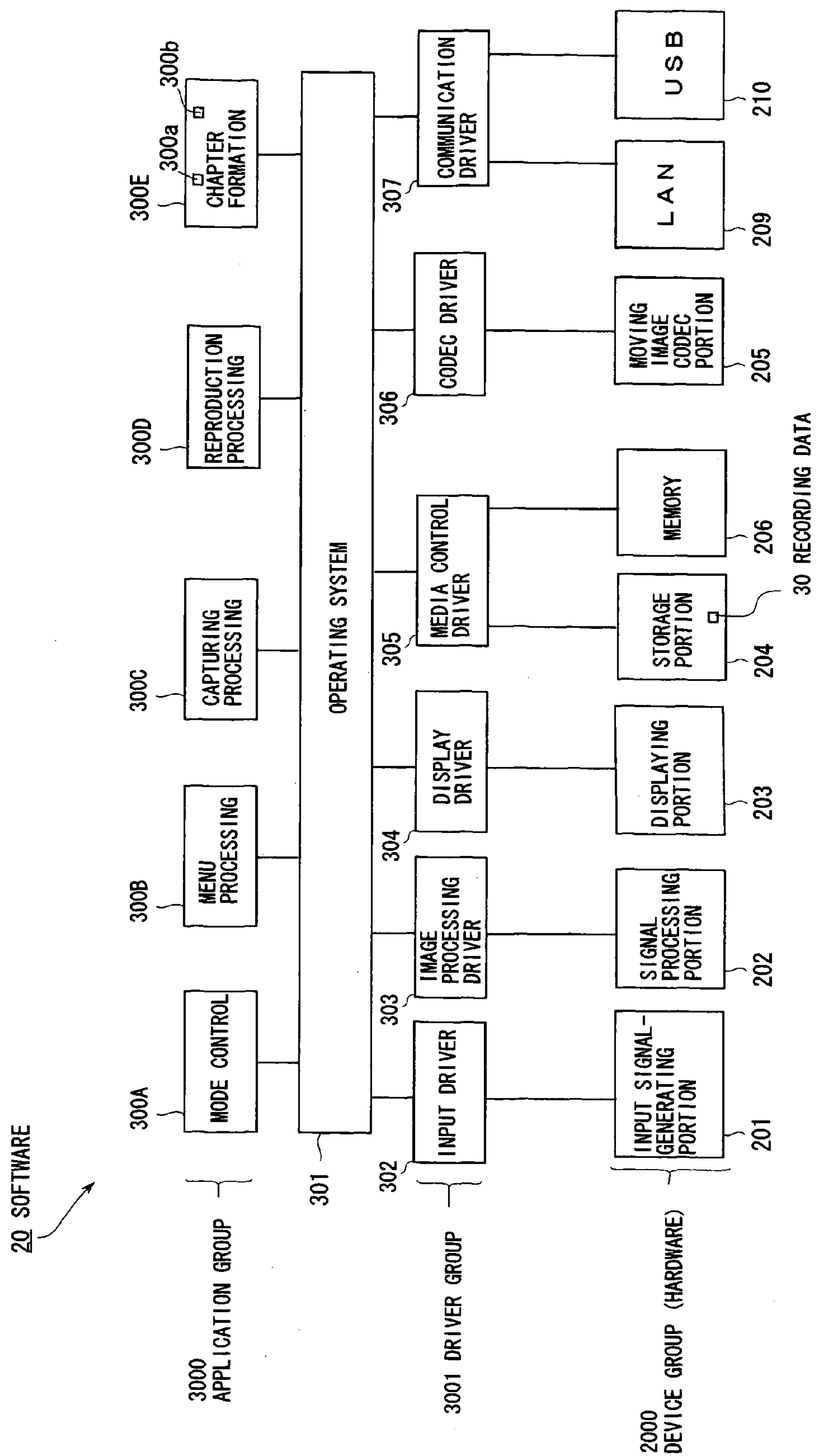
FIG. 3
20 SOFTWARE
3000 APPLICATION GROUP
300A MODE CONTROL
300B MENU PROCESSING
300C CAPTURING PROCESSING
300D REPRODUCTION PROCESSING
300E CHAPTER FORMATION
300a
300b
301 OPERATING SYSTEM
3001 DRIVER GROUP
302 INPUT DRIVER
303 IMAGE PROCESSING DRIVER
304 DISPLAY DRIVER
305 MEDIA CONTROL DRIVER
306 CODEC DRIVER
307 COMMUNICATION DRIVER
2000 DEVICE GROUP (HARDWARE)
201 INPUT SIGNAL-GENERATING PORTION
202 SIGNAL PROCESSING PORTION
203 DISPLAYING PORTION
204 STORAGE PORTION
30 RECORDING DATA
206 MEMORY
205 MOVING IMAGE CODEC PORTION
209 LAN
210 USB

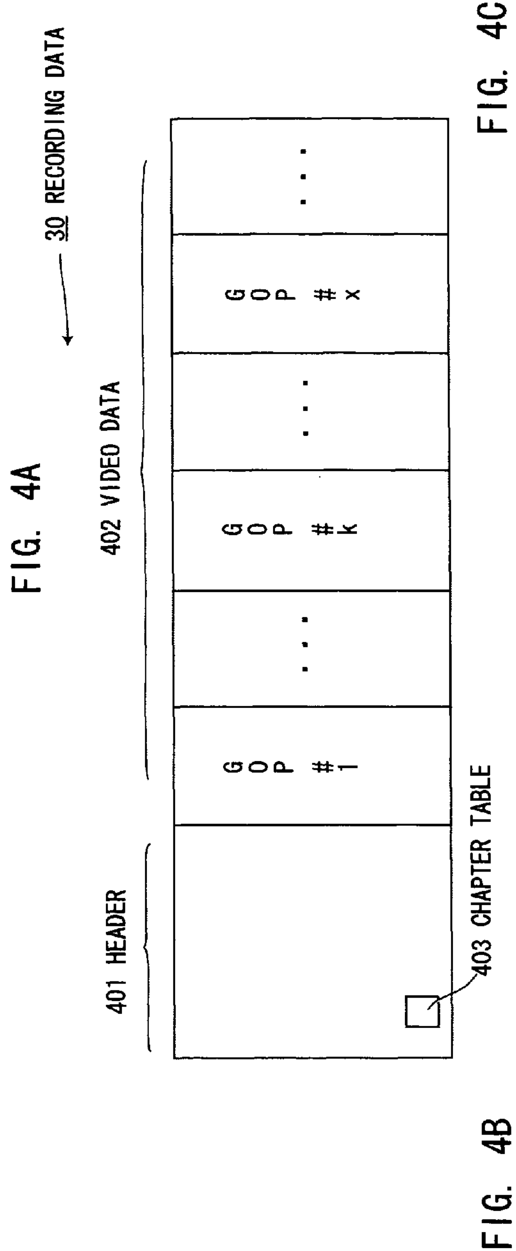
FIG. 4A
30 RECORDING DATA
401 HEADER
402 VIDEO DATA
403 CHAPTER TABLE
GOP #1
GOP #k
GOP #x
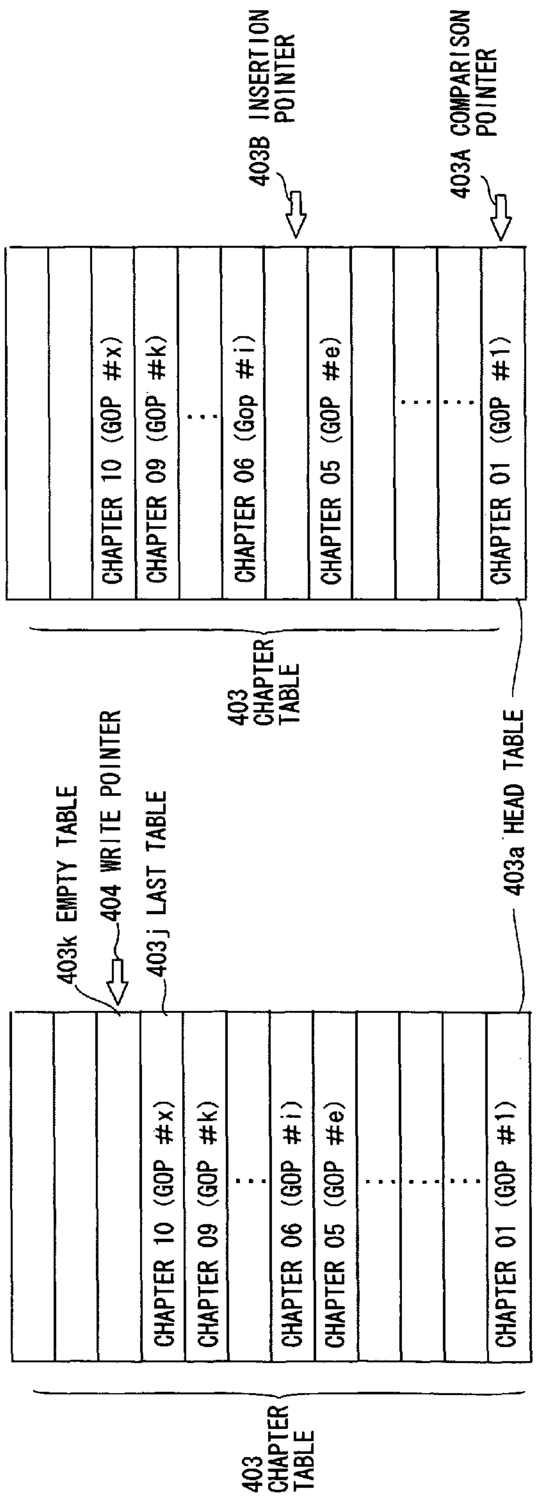
FIG. 4B
403k EMPTY TABLE
404 WRITE POINTER
403j LAST TABLE
403a HEAD TABLE
CHAPTER 10 (GOP #x)
CHAPTER 09 (GOP #k)
CHAPTER 06 (GOP #i)
CHAPTER 05 (GOP #e)
CHAPTER 01 (GOP #1)
403 CHAPTER TABLE
FIG. 4C
403B INSERTION POINTER
403A COMPARISON POINTER
CHAPTER 10 (GOP #x)
CHAPTER 09 (GOP #k)
CHAPTER 06 (Gop #i)
CHAPTER 05 (GOP #e)
CHAPTER 01 (GOP #1)
403 CHAPTER TABLE

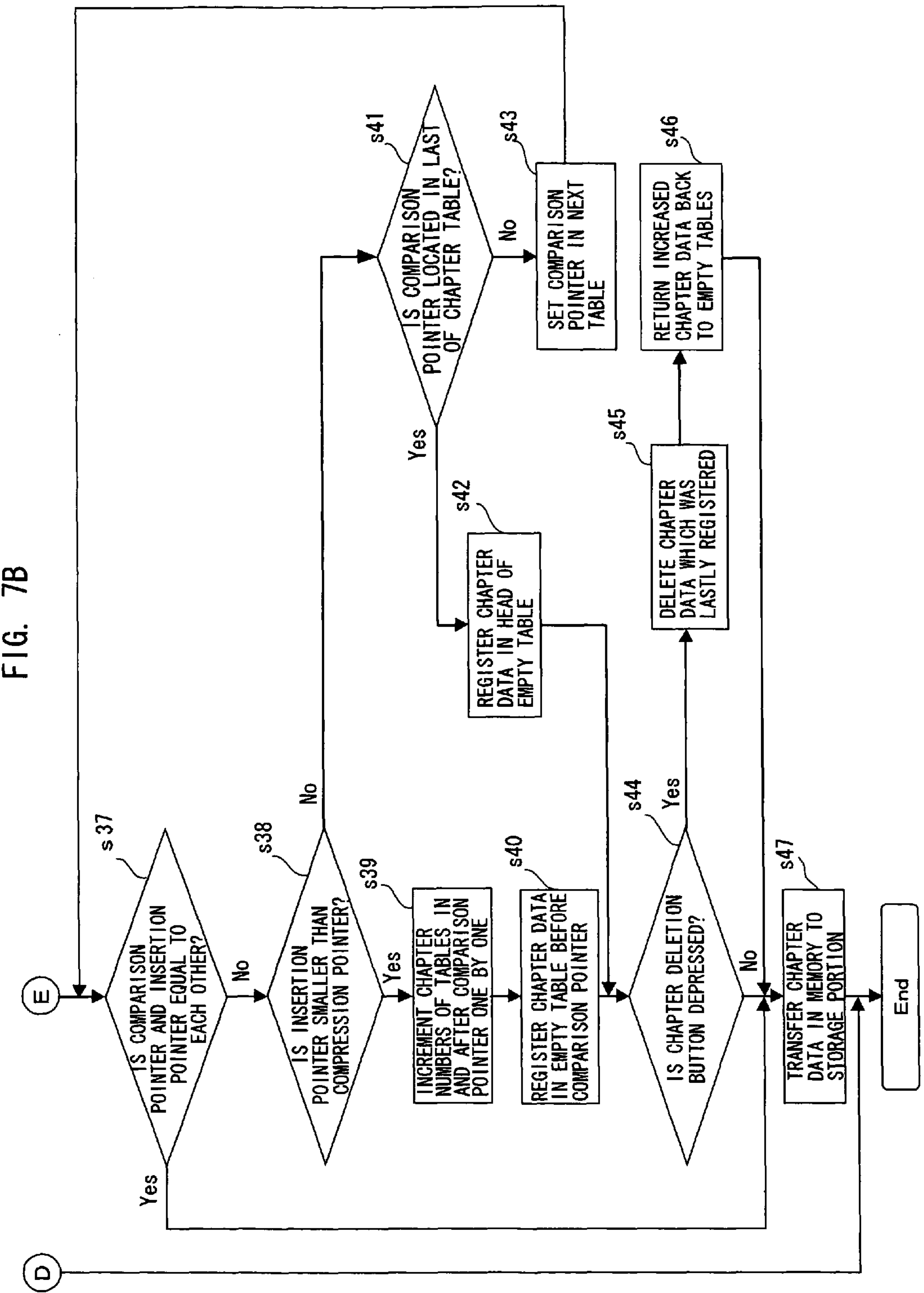
FIG. 7B
E
s37
IS COMPARISON POINTER AND INSERTION POINTER EQUAL TO EACH OTHER?
Yes
No
s38
IS INSERTION POINTER SMALLER THAN COMPRESSION POINTER?
Yes
No
s39
INCREMENT CHAPTER NUMBERS OF TABLES IN AND AFTER COMPARISON POINTER ONE BY ONE
s40
REGISTER CHAPTER DATA IN EMPTY TABLE BEFORE COMPARISON POINTER
s41
IS COMPARISON POINTER LOCATED IN LAST OF CHAPTER TABLE?
Yes
No
s42
REGISTER CHAPTER DATA IN HEAD OF EMPTY TABLE
s43
SET COMPARISON POINTER IN NEXT TABLE
s44
IS CHAPTER DELETION BUTTON DEPRESSED?
Yes
No
s45
DELETE CHAPTER DATA WHICH WAS LASTLY REGISTERED
s46
RETURN INCREASED CHAPTER DATA BACK TO EMPTY TABLES
s47
TRANSFER CHAPTER DATA IN MEMORY TO STORAGE PORTION
End
D

IMAGE PICK-UP APPARATUS

The present application is based on Japanese patent application No. 2006-177930, the entire contents of which are incorporated herein by reference.

BACKGROUND

1. Field

One embodiment of the invention relates to an image pick-up apparatus which is capable of forming chapters in a plurality of arbitrary time positions, respectively, during capturing or reproduction of a moving image.

2. Description of the Related Art

An image pick-up apparatus in which, for example, a time position in which the capturing is restarted after the capturing is temporarily stopped while a moving image is captured is set as a chapter, thereby automatically forming the chapter has been known as the related art in this field. This image pick-up apparatus, for example, is disclosed in the Japanese Patent Kokai No. 2004-364325.

According to the image pick-up apparatus described in the Japanese Patent Kokai No. 2004-364325, a chapter is automatically formed in a time position in which the capturing is restarted after the capturing is temporarily stopped while a moving image is captured, and the capturing data is recorded together with the resulting chapter. It is natural that when the recording data is reproduced, a reproduction pointer can be set at a time point when the recording data is started to be recorded. Moreover, the reproduction starting point can be selected by setting the reproduction pointer in a chapter as well which is formed in a time position of restart of the capturing.

However, since the chapter is formed in the time position of restart of the capturing in the conventional image pick-up apparatus, the time position where the chapter is formed is not necessarily set in the time position in which a user desires to form the chapter. As a result, it is impossible for the user to form the chapter in an arbitrary time position during the capturing of a moving image, and to set the arbitrary time position as the reproduction starting point. On the other hand, when the user is attempting to form the chapter in an arbitrary time position and repeatedly makes the temporary stop during the capturing of a moving image, the continuity which the moving image essentially has is impaired.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is an exemplary block diagram showing a software structure in the image pick-up apparatus according to the embodiment of the invention;

FIG. 4A is an exemplary schematic diagram showing a structure of moving image data in the image pick-up apparatus according to the embodiment of the invention;

FIGS. 4B and 4C are respectively exemplary diagrams each showing a chapter table in the image pick-up apparatus according to the embodiment of the invention;

FIG. 7B is an exemplary flow chart showing the chapter inserting processing executed in the phase of the reproduction of the recording data in the image pick-up apparatus according to the embodiment of the invention;

DETAILED DESCRIPTION OF PREFERRED EMBODIMENTS

Figure 1A:
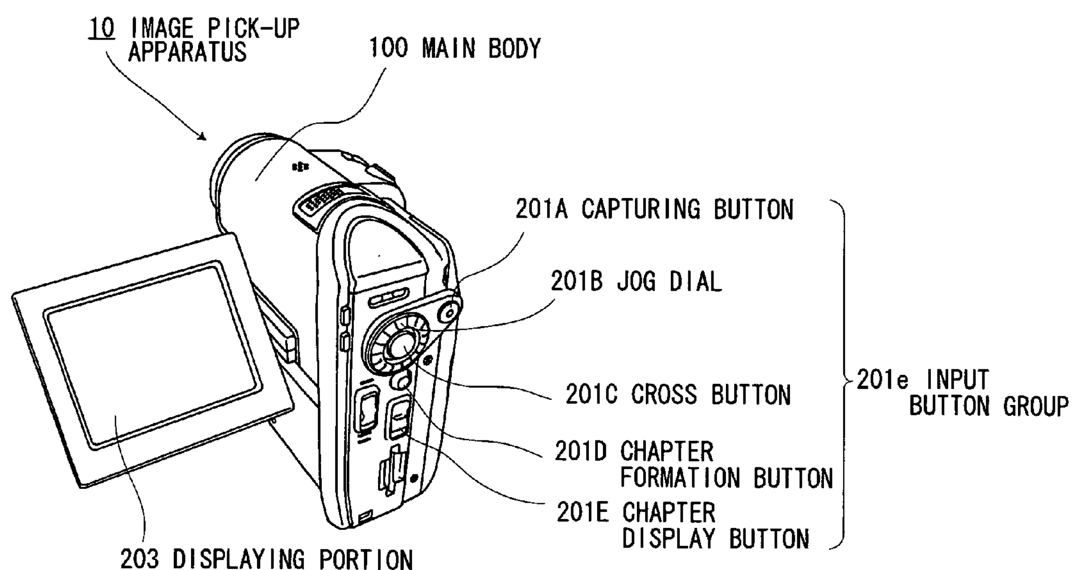
FIG. 1A is an exemplary perspective view of an image pick-up apparatus, when viewed from a back face side thereof, according to an embodiment of the invention.

Various embodiments according to the invention will be described hereinafter with reference to the accompanying drawings. In general, according to one embodiment of the invention, there is provided an image pick-up apparatus, including: a signal processing portion for processing capturing data to generate recording data; a first storage portion for storing therein the recording data generated through the processing in the signal processing portion, and a chapter table having a chapter number of the recording data, and information on a reproduction starting point corresponding to the chapter number; a second storage portion for temporarily storing therein the chapter number and the information on the reproduction starting point during the generation of the recording data; a chapter formation-commanding portion for commanding formation of a chapter; and a chapter registering portion for acquiring a time position of the recording data at a time point when the chapter formation-commanding portion commands the formation of the chapter, registering information on the time position of the recording data as the reproduction starting point in the second storage portion with the time position of the recording data being associated with the chapter number, and recording the registered chapter number and the information on the reproduction starting point in the chapter table of the first storage portion after completion of the generation of the recording data.

According to the embodiment of the invention, the chapters can be formed in a plurality of arbitrary time positions, respectively, during the capturing of the moving image.

In addition, according to a further embodiment of the invention, there is provided an image pick-up apparatus, including: a first storage portion for storing therein recording data, and a chapter table having a chapter number of the recording data and information on a reproduction starting point corresponding to the chapter number; a signal processing portion for processing the recording data to output a regenerative signal; a displaying portion for displaying thereon a moving image in accordance with the regenerative signal; a second storage portion for temporarily storing therein the chapter number and the information on the reproduction starting point during reproduction of the recording data; a chapter formation-commanding portion for commanding formation of a chapter; and a chapter registering portion for acquiring a time position of the recording data at a time point when the chapter formation-commanding portion commands the formation of the chapter, registering information on the time position of the recording data as a reproduction starting point in the second storage portion with the time position of the recording data being associated with the chapter number, and recording the registered chapter number and the information on the reproduction starting point in the chapter table of the first storage portion after completion of the generation of the recording data.

According to the embodiment of the invention, the chapters can be formed in a plurality of arbitrary time positions, respectively, during the capturing of the moving image.

In addition, according to a still further embodiment of the invention, there is provided an image pick-up apparatus, including: a first storage portion for storing therein recording data, and a chapter table having a chapter number of the recording data and information on a reproduction starting point corresponding to the chapter number; a signal processing portion for processing the recording data to output a regenerative signal; a displaying portion for displaying thereon a moving image in accordance with the regenerative signal; a second storage portion for temporarily storing therein the chapter number and the information on the reproduction starting point during reproduction of the recording data; and a menu processing portion for causing the displaying portion to display thereon the chapter number in the chapter table and an image associated with the chapter number.

According to the embodiment of the invention, the image associated with the chapter can be displayed on the displaying portion, and the desired reproduction starting point can be readily selected.

According to these embodiments of the invention, the chapter can be formed in a desired arbitrary time position during the capturing or reproduction of the moving image. In addition, the display of the image associated with the chapter makes it possible to readily select the desired reproduction starting point or to readily delete the chapter.

An image pick-up apparatus according to an embodiment of the invention will be described in detail hereinafter with reference to FIGS. 1A and 1B to FIGS. 8A and 8B.

(Configuration of Image Pick-up Apparatus)

FIG. 1A is a perspective view of an image pick-up apparatus, when viewed from a back face side thereof, according to an embodiment of the invention.

An image pick-up apparatus 10 includes a main body 100 which has, in its inside, electronic devices such as a charge coupled device (CCD), a CPU, and a miniature hard disc drive (HDD), lenses (not shown) including a plurality of lens groups having a zooming function for imaging a light on the CCD, a displaying portion 203 movably mounted to a side portion of the main body 100 for displaying thereon characters, an image or the like, and an input button group 201*e* with which a user can perform various kinds of manipulations.

The input button group 201*e* has a capturing button 201A with which start of the capturing is instructed, a jog dial 201B with which a reproduction speed for a moving image can be continuously changed in a reverse direction as well as in a forward direction, a cross button 201C with which stop, temporary stop or the like of the image-capturing can be instructed, a chapter formation button 201D with which a chapter can be formed, and a chapter display button 201E with which a list of chapters can be displayed on the displaying portion 203.

Figure 1B:
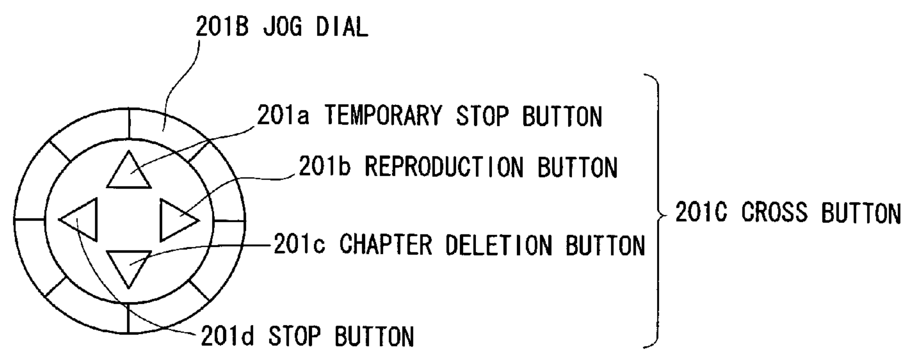
FIG. 1B is an exemplary plan view of a button input portion of the image pick-up apparatus according to the embodiment of the invention.

FIG. 1B is an enlarged view of the cross button 201C which is provided inside the imaging dial 201B shown in FIG. 1A.

The cross button 201C has a temporary stop button 201*a* with which the capturing or reproduction of recording data corresponding to a moving image is temporarily stopped, a reproduction button 201*b* with which recording data corresponding to the moving image is reproduced, a chapter deletion button 201*c* with which chapter data registered in a chapter table 403 which will be described later can be deleted, and a stop button 201*d* with which the capturing or reproduction is stopped.

Figure 2:
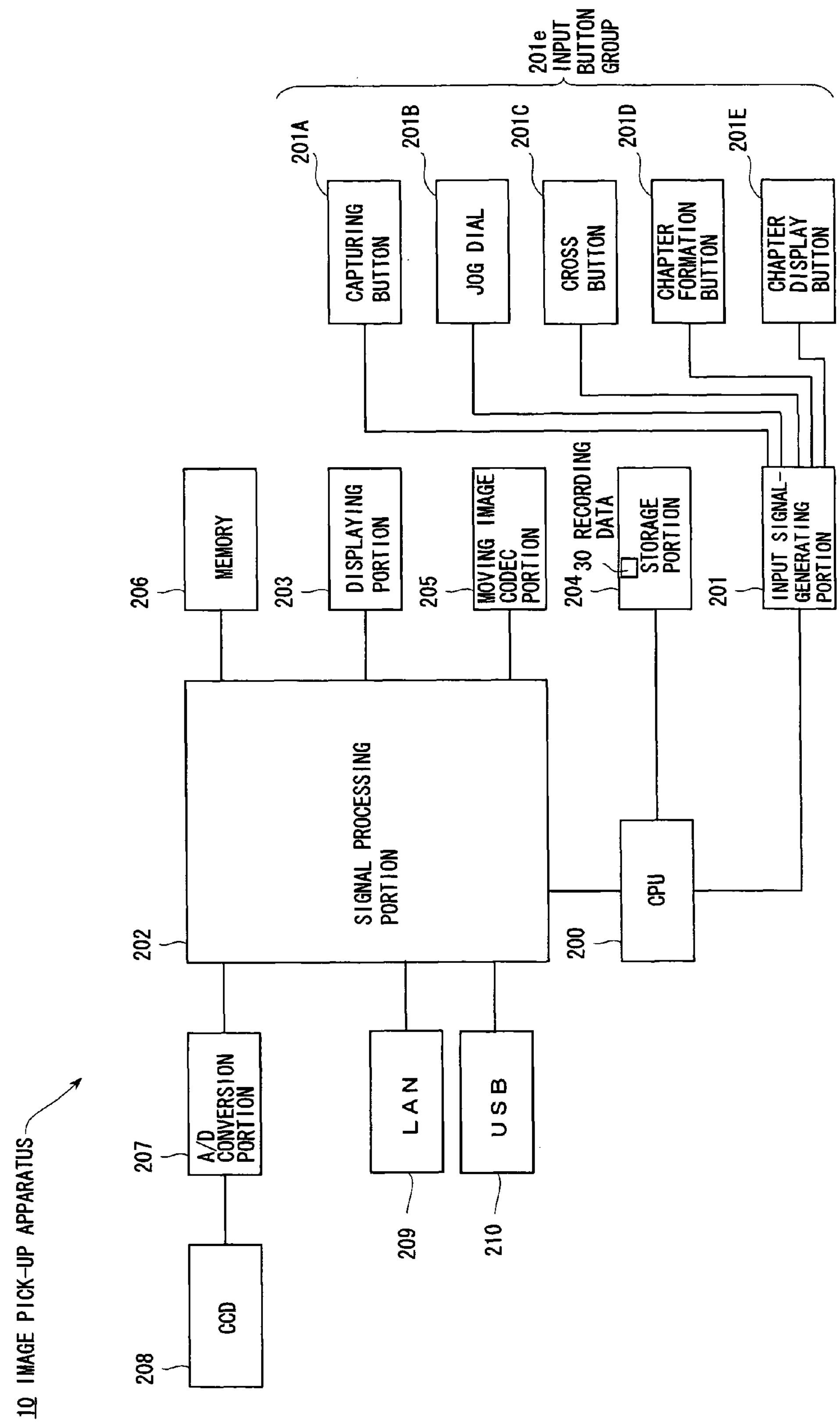
FIG. 2 is an exemplary block diagram showing a configuration of the image pick-up apparatus according to the embodiment of the invention.

FIG. 2 is a schematic block diagram showing a configuration of the image pick-up apparatus according to the embodiment of the invention.

The image pick-up apparatus 10 has a CPU 200 for issuing instructions to corresponding portions, respectively, in accordance with an input signal which is outputted from an input signal-generating portion 201 by manipulating the input button group 201*e*, a CCD 208 for electrically outputting a video signal corresponding to a captured image in the form of an analog signal, an A/D conversion portion 207 for converting the analog signal outputted from the CCD 208 into a digital signal, a signal processing portion 202 for generally managing the video signal inputted thereto, a memory 206 for temporarily storing therein the chapter table 403 which will be described later, or the like, a moving image codec portion 205 for compressing or expanding a video signal, a storage portion 204 for storing therein compressed recording data 30 or the like, a displaying portion 203 serving as an image monitor in a phase of the capturing and the reproduction, and a LAN 209 and a USB 210 through which a communication is made with the outside.

(Structure of Software)

FIG. 3 is a schematic block diagram showing a software structure in the image pick-up apparatus according to the embodiment of the invention.

Software 20 includes an application group 3000, an operating system 301, and a driver group 3001. A device group 2000, as hardware, corresponding to the respective drivers is connected to the software 20. The software 20 is stored in the storage portion 204 and is processed by the CPU 200 to operate.

The application group 3000 has mode control 300A for controlling a mode such as the capturing or the reproduction, menu processing 300B for processing various kinds of menu items, capturing processing 300C for executing encode processing, moving image recording processing or the like for an image in the phase of the capturing, reproduction processing 300D for executing decode processing or the like for an image in the phase of the reproduction, and chapter formation 300E for commanding formation of chapter data. Also, the chapter formation 300E includes a chapter formation-commanding portion 300*a* and a chapter registering portion 300*b*.

The operating system 301 generally manages the application group 3000 and the driver group 3001.

The driver group 3001 has an input driver 302 for managing the input signal-generating portion 201, an image processing driver 303 for managing the signal processing portion 202, a display driver 304 for managing the displaying portion 203, a media control driver 305 for managing the storage portion 204 and the memory 206, a codec driver 306 for managing the moving image codec portion 205, and a communication driver 307 for managing the LAN 209 and the USB 210 through which the communication is made with the outside.

(Structure of Recording Data)

FIG. 4A is a schematic diagram showing a structure of recording data in the image pick-up apparatus according to the embodiment of the invention.

Recording data 30 has a header 401 for managing the recording or reproduction of the recording data corresponding to the moving image, and video data 402. The header 401 has the chapter table 403 in which the chapter data is registered. The video data 402 is constituted by groups of video data, set in units of, for example, 0.5 seconds, which are called plural groups of pictures (GOP) which correspond to time periods for a moving image and are represented by GOP #1 . . . , GOP #k . . . , GOP #x . . . , respectively. Here, reference symbols #1 . . . , #k . . . , #x . . . are used to define an arrangement of the GOP and are called GOP numbers.

FIGS. 4B and 4C are respectively schematic diagrams each showing a structure of the chapter table in the image pick-up apparatus according to the embodiment of the invention.

The chapter table 403 includes a head table 403*a* as a table set in the head of the chapter table 403, a last table 403*j* as a table set in the last of the registered chapters, an empty table 403*k* set in the head of the tables in each of which no chapter is registered, a write pointer 404 with which a chapter is set in a registerable table, a comparison pointer 403A which is set for comparison with a time position of a chapter desired to be inserted, and an insertion pointer 403B which is set in a time position of the chapter desired to be inserted.

(Structure of Chapter List Display Picture)

Figure 5:
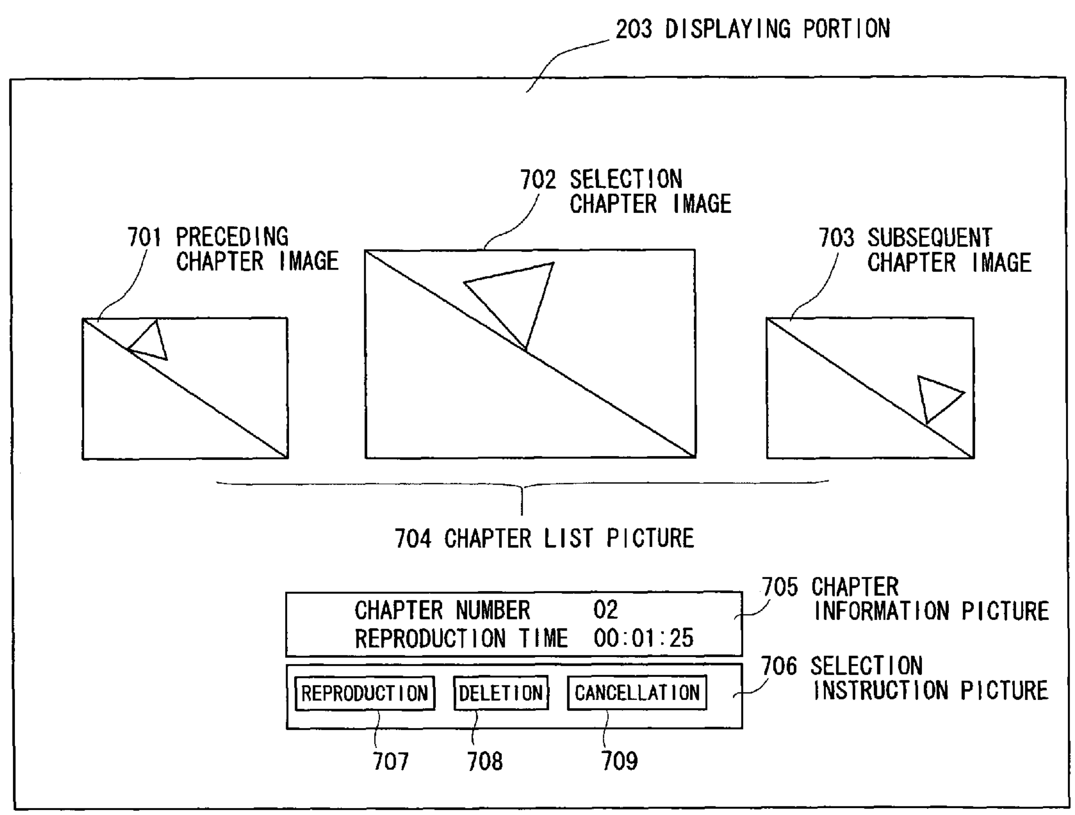
FIG. 5 is an exemplary schematic diagram showing a display picture of a chapter list in the image pick-up apparatus according to the embodiment of the invention.

FIG. 5 is a schematic diagram showing a chapter list display picture in the image pick-up apparatus according to the embodiment of the invention.

A chapter list display picture includes a chapter list picture 704 on which registered chapters 701 to 703 are displayed in a time series manner, a chapter information picture 705 on which chapter data such as a chapter number and a reproduction time is displayed, and a selection instruction picture 706 on which a reproduction icon 707, a deletion icon 708, and a cancellation icon 709 which can be selected by a user are displayed.

(Operation)

An operation of the image pick-up apparatus according to the embodiment of the invention will be described in detail hereinafter with reference to FIGS. 1A and 1B to FIGS. 8A and 8B.

Figure 6A:
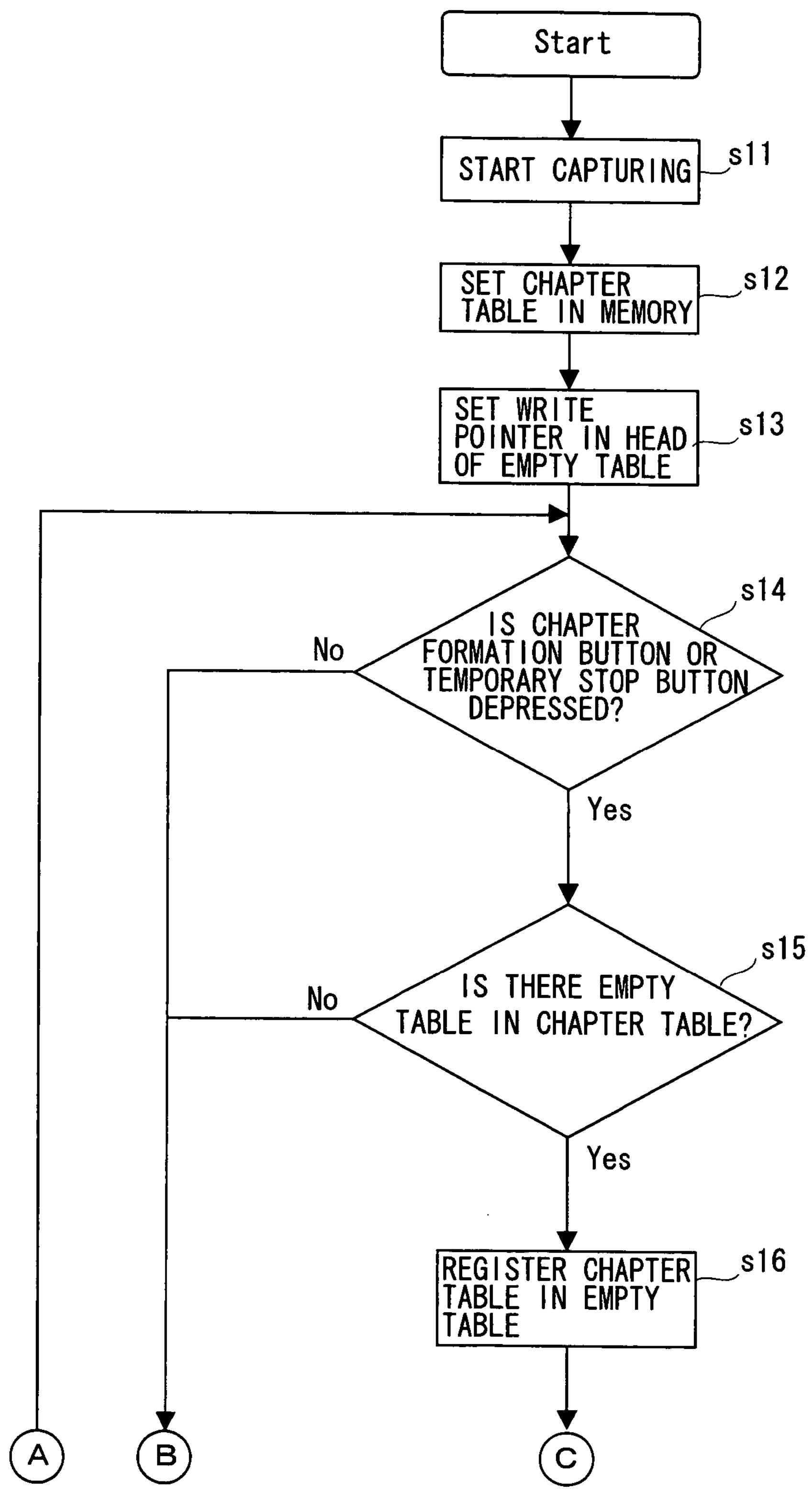
FIG. 6A is an exemplary flow chart showing chapter inserting processing executed in a phase of image capturing in the image pick-up apparatus according to the embodiment of the invention.
Figure 6B:
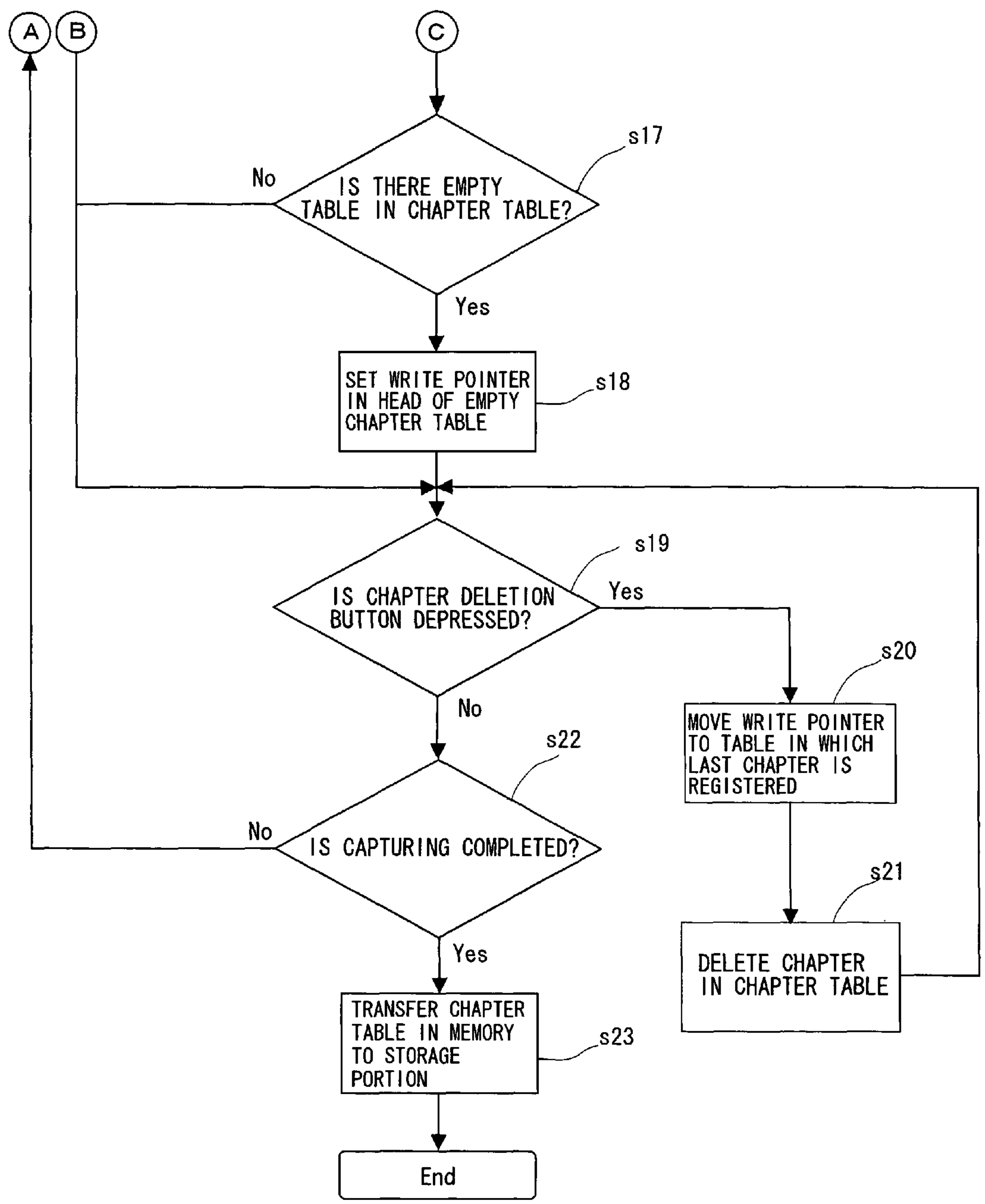
FIG. 6B is an exemplary flow chart showing the chapter inserting processing executed in the phase of the image capturing in the image pick-up apparatus according to the embodiment of the invention.

FIGS. 6A and 6B are respectively flow charts showing chapter inserting processing in the phase of the capturing of a moving image in the image pick-up apparatus according to the embodiment of the invention.

A description will now be given by giving the chapter table 403 shown in FIG. 4B as an example.

When the user depresses the capturing button 201A to start to capture a moving image (s11), the chapter formation-commanding portion 300*a* sets the chapter table 403 in the memory 206 (s12). The chapter table 403 has tables in each of which the chapter data can be registered. Plural pieces of chapter data such chapter numbers are registered in the tables, respectively. The chapter formation-commanding portion 300*a* sets the write pointer 404 in the empty table 403*k* (s13). When the user depresses either the chapter formation button 201D or the temporary stop button 201*a* while the moving image is captured (s14: Yes), the chapter formation-commanding portion 300*a* confirms whether or not there is an empty table in the chapter table 403. When the chapter formation-commanding portion 300*a* confirms that there is the empty table in the chapter table 403 (s15: Yes), the chapter registering portion 300*b* accesses the capturing processing 300C to acquire a GOP number at a time point when the user depresses either the chapter formation button 201D or the temporary stop button 201*a* from the recording data 30 being recorded. The GOP number thus acquired is then written to the empty table 403*k* to register therein the chapter data (s16). Moreover, the chapter formation-commanding portion 300*a* confirms whether or not there is still an empty table in the chapter table 403. When the chapter formation-commanding portion 300*a* confirms that there is still the empty table in the chapter table 403 (s17: Yes), it sets the write pointer 404 in the head of the empty chapter tables (s18).

Here, when the user depresses neither the chapter formation button 201D nor the temporary stop button 201*a* in Step s14 (s14: No), the processing proceeds to Step s19.

Here, when the chapter formation-commanding portion 300*a* confirms that there is no empty table in the chapter table 403 in each of Step s15 and Step s17 (s15: No) (s17: No), the processing proceeds to Step s19.

When the user does not depress the chapter deletion button 201*c* in Step s19 (s19: No), the chapter formation-commanding portion 300*a* confirms whether or not the capturing is completed. When the chapter formation-commanding portion 300*a* confirms that the capturing is completed (s22: Yes), it transfers the chapter table 403 stored in the memory 206 to the storage portion 204 (s23), and the operation ends. On the other hand, when the chapter formation-commanding portion 300*a* confirms that the capturing is not yet completed (s22: No), the processing returns back to Step s14.

On the other hand, when the user depresses the chapter deletion button 201*c* in Step s19 (s19: Yes), the chapter formation-commanding portion 300*a* moves the write pointer 404 to the empty table 403*k* in which the last chapter is registered (s20) and deletes the chapter data registered in the empty table 403*k* (s21). Then, the processing returns back to Step s19 for continuing execution of the processing.

Figure 7A:
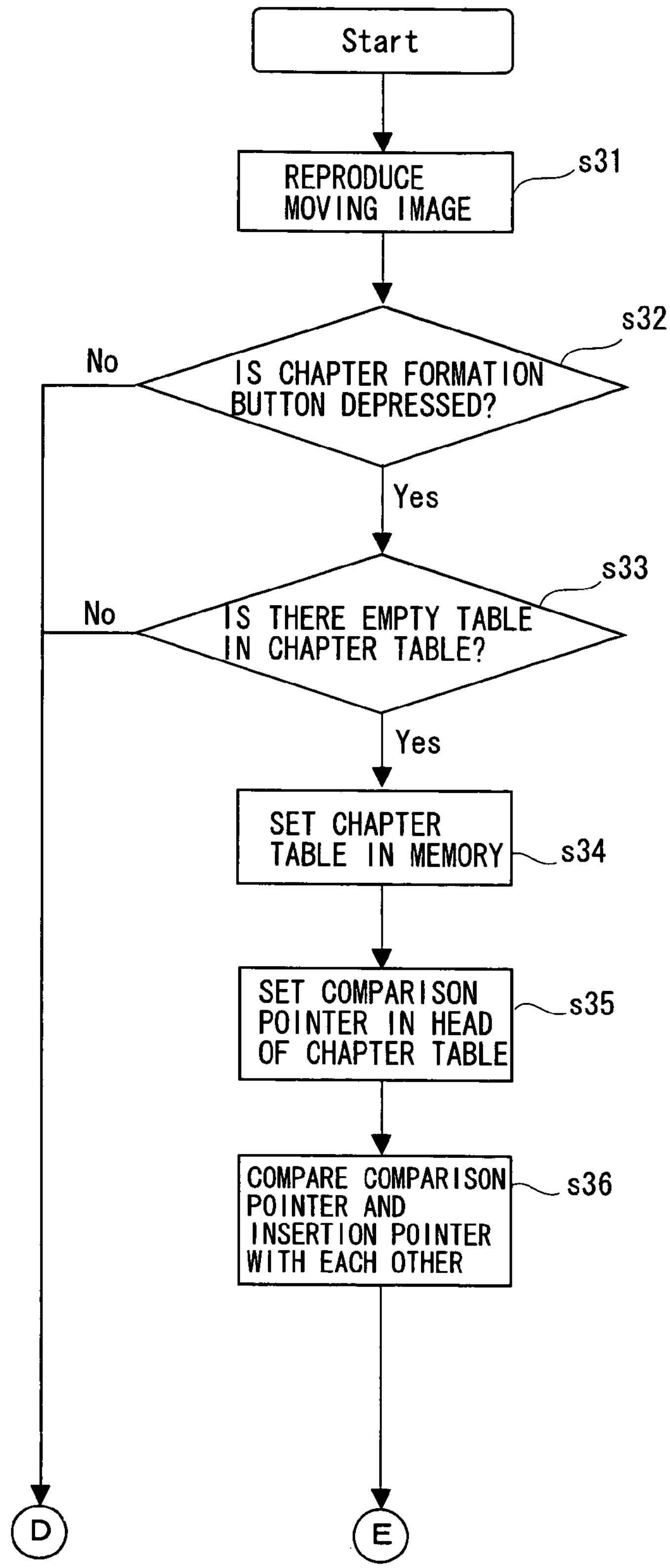
FIG. 7A is an exemplary flow chart showing chapter inserting processing executed in a phase of reproduction of recording data in the image pick-up apparatus according to the embodiment of the invention.

FIGS. 7A and 7B are respectively flow charts showing chapter inserting processing in the phase of the reproduction of the recording data in the image pick-up apparatus according to the embodiment of the invention.

A description will now be given by giving, as an example, the case where a chapter is inserted between a chapter 05 (GOP #e) and a chapter 06 (GOP #i) in the chapter table 403.

When the user depresses the reproduction button 201*b*, the reproduction of the recording data corresponding to the moving image is started (s31). If the user depresses the chapter formation button 201D when a reproduction position comes in which the user desires to form a chapter (s32: Yes), the chapter formation-commanding portion 300*a* confirms whether or not there is an empty table in the chapter table 403. When the chapter formation-commanding portion 300*a* confirms that there is the empty table in the chapter table 403 (s33: Yes), it sets the chapter table 403 in the memory 206 (s34).

On the other hand, when the user does not depress the chapter formation button 201D in Step s32 (s32: No), the chapter formation-commanding portion 300*a* completes the processing.

On the other hand, when the chapter formation-commanding portion 300*a* confirms that there is no empty table in the chapter table 403 (s33: No), the chapter formation-commanding portion 300*a* completes the processing.

The chapter formation-commanding portion 300*a* sets the comparison pointer 403A in the head chapter 403*a* of the chapter table 403 (s35). An arbitrary time position of the chapter which the user desires to insert is set as the insertion pointer 403B, and the time position of the comparison pointer 403A and the time position of the insertion pointer 403B are compared with each other (s36). Here, the chapter 01 (GOP #1) shown in FIG. 4B means that the chapter 01 is inserted into GOP #1. Therefore, the time position which the pointer points to is set in units of GOP (0.5 seconds). When the comparison pointer 403A and the insertion pointer 403B are equal in chapter number to each other (s37: Yes), the chapter has already been set in the time position into which the user desires to insert the chapter concerned. Thus, the chapter table stored in the memory 206 is transferred to the storage portion 204, and the processing ends (s47).

On the other hand, when the comparison pointer 403A and the insertion pointer 403B are not equal in chapter number to each other (s37: No), and thus the insertion pointer 403B is larger in chapter number than the comparison pointer 403A (s38: No), the chapter formation-commanding portion 300*a* confirms whether or not the comparison pointer 403A points to the last chapter 10 (GOP #x). When the chapter formation-commanding portion 300*a* confirms that the comparison pointer 403A does not point to the last chapter 10 (s41: No), it sets the comparison pointer 403A again in the table next to the table which the comparison pointer 403A points to (s43), and compares the chapter number of the comparison table 403A and the chapter number of the insertion pointer 403B with each other again (s37).

On the other hand, when the chapter formation-commanding portion 300*a* confirms that the comparison pointer 403A points to the last chapter 10 (GOP #x) of the tables to each of which the chapter data is written (s41: Yes), it writes the GOP number, (#x+1), to the head of the empty table 403*k* to register therein the chapter data.

When the chapter formation-commanding portion 300*a* repeatedly executes the processing in Step s37, the processing in Step s38, the processing in Step s41, and the processing in Step s43, the comparison pointer 403A soon points to the table which is closest to the insertion pointer 403B in terms of time, and which is set after the insertion pointer 403B in terms of time (s38: Yes). In this case, the comparison pointer 403A points to the chapter 06 because the GOP number corresponding to the insertion pointer 403A is located between the chapters 05 and 06. In order to insert the chapter desired to be registered into the chapter 06 which the comparison pointer 403A points to, the positions of the tables in and after the table which the comparison pointer 403A points to are moved upward in FIG. 4C on a one-by-one basis. In addition, the chapter numbers of the tables in and after the table which the comparison pointer 403A points to are incremented on a one-by-one basis (s39). For example, the number, 06, of the chapter 06 is incremented to the number, 07, of the chapter 07, the number, 10, of the chapter 10 is incremented to the number, 11, of the chapter 11, and so forth. A chapter is inserted into the table in which the chapter 06 was registered (s40). After this, when the user does not depress the chapter deletion button 201*c* (s44: No), the chapter table 403 stored in the memory 206 is transferred to the storage portion 204 (s47), and the processing ends.

On the other hand, when the user depresses the chapter deletion button 201*c* in Step s44 (s44: Yes), the chapter data which was lastly registered is deleted (s45), and the increased amount of chapter data is returned back to the empty tables on a one-by-one basis so as to follow a procedure reverse to that in Step s39 (s46). Then, the chapter table 403 stored in the memory 206 is transferred to the storage portion 204 (s47), and the processing ends.

Figure 8A:
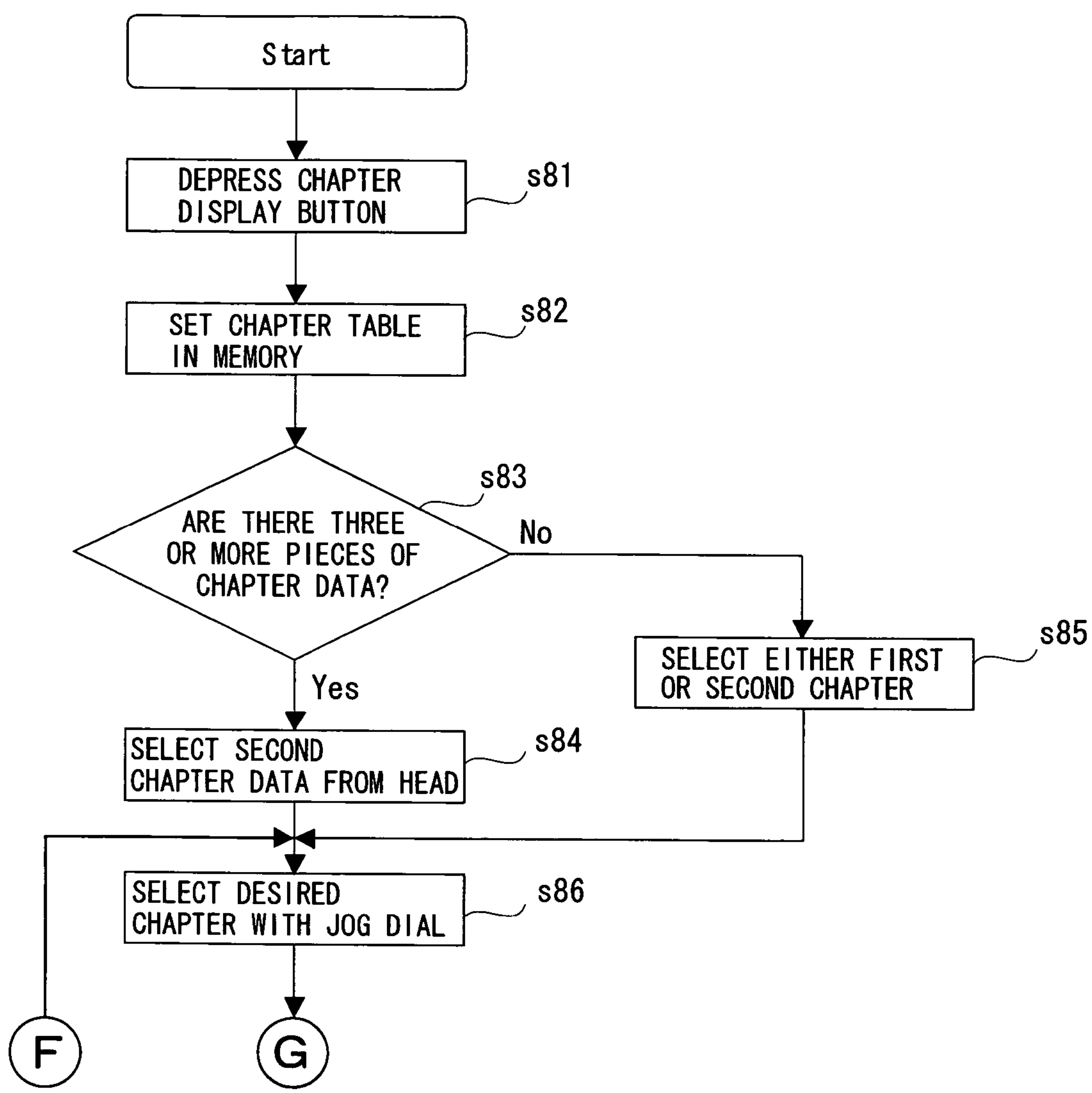
FIG. 8A is an exemplary flow chart showing an operation with a display picture of a chapter list in the image pick-up apparatus according to the embodiment of the invention.
Figure 8B:
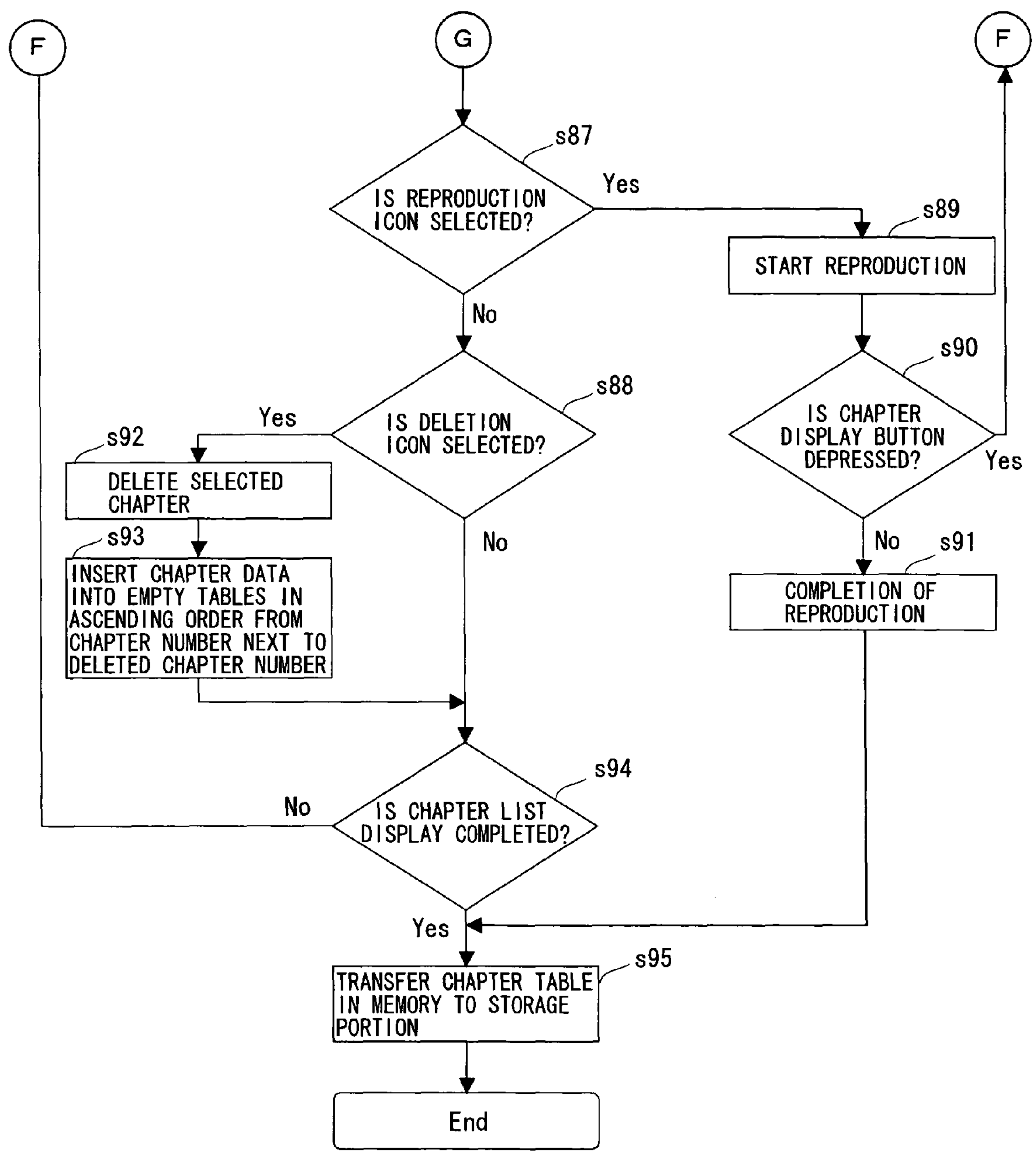
FIG. 8B is an exemplary flow chart showing the operation with the display picture of the chapter list in the image pick-up apparatus according to the embodiment of the invention.

FIGS. 8A and 8B are respectively flow charts showing an operation in the chapter list display picture in the image pick-up apparatus according to the embodiment of the invention.

The flow charts shown in FIGS. 8A and 8B, respectively, are ones with respect to the reproduction of the recording data from the chapter selected among the registered chapters the list of which is displayed on the displaying portion 203, the deletion of the selected chapter, and the like. A description will now be given with respect to the operation in the chapter list display picture with reference to the chapter images 701 to 703 shown in FIG. 5.

When a power source of the image pick-up apparatus 10 is turned ON and the chapter display button 201E is then depressed (s81), the chapter formation-commanding portion 300*a* sets the chapter table 403 in the memory 206 (s82). When there are, for example, three or more pieces of chapter data registered in the chapter table 403 (s83: Yes), the chapter formation-commanding portion 300*a* reads out the first three chapters from the chapter table 403. Also, the chapter formation-commanding portion 300*a* instructs the displaying portion 203 to display the images 701, 702 and 703 associated with the registered chapters, respectively, on the chapter list picture 704 in a time series manner, sets a selection chapter image 702 in a selection state, sets the image 701 as a preceding chapter image, and sets the image 703 as a subsequent chapter image 703 (s84).

On the other hand, when there are two or less pieces of chapter data registered in the chapter table 403 (s83: No), the head chapter is set in a selection state if there is one piece of chapter data registered in the chapter table 403, and the image of the second chapter is set as the selection chapter image 702 if there are two pieces of chapter data registered in the chapter table 403 (s85).

When there is no desired chapter on the chapter list display picture 704, the user can search for an arbitrary chapter by manipulating the jog dial 201B.

Here, when the user selects the reproduction icon 707 in the selection instruction picture 706 in Step s87 (s87: Yes), the recording data is started to be reproduced from the selection instruction picture 706 (s89). When the user does not depress the chapter display button 201E during the reproduction (s90: No), the recording data is continued to be reproduced until completion of the reproduction just it is (s91). On the other hand, when the user depresses the chapter display button 201E during the reproduction (s90: Yes), the processing returns back to Step s86, and the necessary processing is continuously executed.

Here, when the user selects the deletion icon 708 in Step s88 (s88: Yes), the chapter formation-commanding portion 300*a* deletes the corresponding chapter of the selection chapter image 702 (s92), and inserts the chapter data into the empty table obtained through the deletion in ascending order from the chapter number next to the deleted chapter number (s93).

On the other hand, when the user does not select the reproduction icon 707 (s87: No) and also does not select the chapter deletion icon 708 as well (s88: No), the chapter formation-commanding portion 300*a* confirms whether or not the chapter list display is completed. When the chapter formation-commanding portion 300*a* confirms that the chapter list display is completed (s94: Yes), it transfers the chapter table 403 stored in the memory 206 to the storage portion 204, and then the processing ends. On the other hand, when the chapter formation-commanding portion 300*a* confirms that the chapter list display is not yet completed (s94: No), the processing returns back to Step s86 and the necessary processing is continuously executed.

Effects of Embodiment

According to the above-mentioned embodiment of the invention, the depressing of either the chapter formation button 201D or the temporary stop button 201*a* during the capturing of the moving image results in that the chapters can be formed in a plurality of arbitrary time positions, respectively, and thus the reproduction pointer can be set in an arbitrary chapter to select the reproduction starting point.

In addition, according to the above-mentioned embodiment of the invention, the depressing of the chapter formation button 201D during the capturing of the moving image results in that the chapters can be formed in a plurality of arbitrary time positions, respectively, and thus the reproduction pointer can be set in an arbitrary chapter to select the reproduction starting point.

Also, the chapter list display makes it possible to reproduce the recording data from the desired chapter and to delete the chapter. As a result, the convenience for the user can be enhanced.

It should be noted that the present invention is not limited to the embodiments described above, and the various combinations and changes may be made without departing from or changing the technical idea of the present invention.

What is claimed is:

1. An image pick-up apparatus, comprising:

a capturing button with which the capturing is instructed;

a reproduction button with which the reproduction of recording data is instructed;

a chapter formation button with which the formation of chapter is instructed;

a signal processing portion for processing capturing data acquired from the capturing to generate the recording data, a first storage portion for storing therein the recording data, and a chapter table including a chapter number of the chapter;

a second storage portion for temporarily storing therein the chapter table transferred from the first storage portion;

a chapter formation-commanding portion for forming and registering the chapter data in the chapter table of the second storage portion based on depression of the chapter formation button while the capturing is performed after the capturing button is depressed, and forming and registering the chapter data in the chapter table of the second storage portion based on depression of the chapter formation button while the reproduction of the recording data is performed after the reproduction button is depressed; and a control portion for transferring the chapter table from the first storage portion to the second storage portion and registering the chapter data in the chapter table by the chapter formation-commanding portion, and then transferring the chapter table from the second storage portion to the first storage portion.

2. The image pick-up apparatus according to claim 1, wherein the chapter formation-commanding portion registers new chapter data in a position of a desired chapter number of existing chapter data including a series of chapter number while the reproduction of the recording data is performed, and providing an increment of plus one for the chapter number of the existing chapter data that has a chapter number equal to or larger than the desired chapter number.

3. The image pick-up apparatus according to claim 1, wherein the image pick-up apparatus further comprises a temporary stop button with which the capturing is temporarily stopped, and the chapter formation-commanding portion registers the chapter data in the chapter table of the second storage portion when the temporary stop button is depressed and the capturing is temporarily stopped.

4. The image pick-up apparatus according to claim 1, wherein the chapter formation-commanding portion sets a reproduction pointer in which an arbitrary chapter of the chapter table is determined as the reproduction starting point.

5. The image pick-up apparatus according to claim 1, wherein the image pick-up apparatus further comprises a chapter deletion button with which chapters in the chapter table are deleted, and the chapter formation-commanding portion deletes the chapter registered at the end of the chapter table when the chapter deletion button is depressed.

* * * * *